United States Patent [19]
Rymer

[11] 4,215,968
[45] Aug. 5, 1980

[54] CONTAINER-DUMPING MACHINE

[76] Inventor: Richard Rymer, 4128 E. Saxony Dr. SE., Grand Rapids, Mich. 49508

[21] Appl. No.: 909,510

[22] Filed: May 25, 1978

[51] Int. Cl.² .............................................. B65B 21/02
[52] U.S. Cl. .................................. 414/421; 298/22 B
[58] Field of Search ....................... 414/420, 421, 422; 105/271, 273; 298/22 B; 248/140, 142

[56] References Cited

U.S. PATENT DOCUMENTS

| | | | |
|---|---|---|---|
| 3,279,635 | 10/1966 | Avery | 414/420 |
| 3,347,399 | 10/1967 | Ensinger | 414/421 |
| 3,948,189 | 4/1976 | Kawai | 105/271 |

FOREIGN PATENT DOCUMENTS 733703 7/1932 France .................................. 298/22 B Primary Examiner—Robert G. Sheridan
Attorney, Agent, or Firm—Glenn B. Morse

[57] ABSTRACT

A frame pivotally supports a container receptacle in a position where a container can be placed conveniently by a lift truck. A carriage mounted for vertical movement under the receptacle bears on the receptacle at a position laterally displaced from the pivot axis. Upward movement of the carriage induces up-and-over dumping movement, during which the container is supported in part by an abutment on the container engageable with the pivot shaft.

8 Claims, 8 Drawing Figures

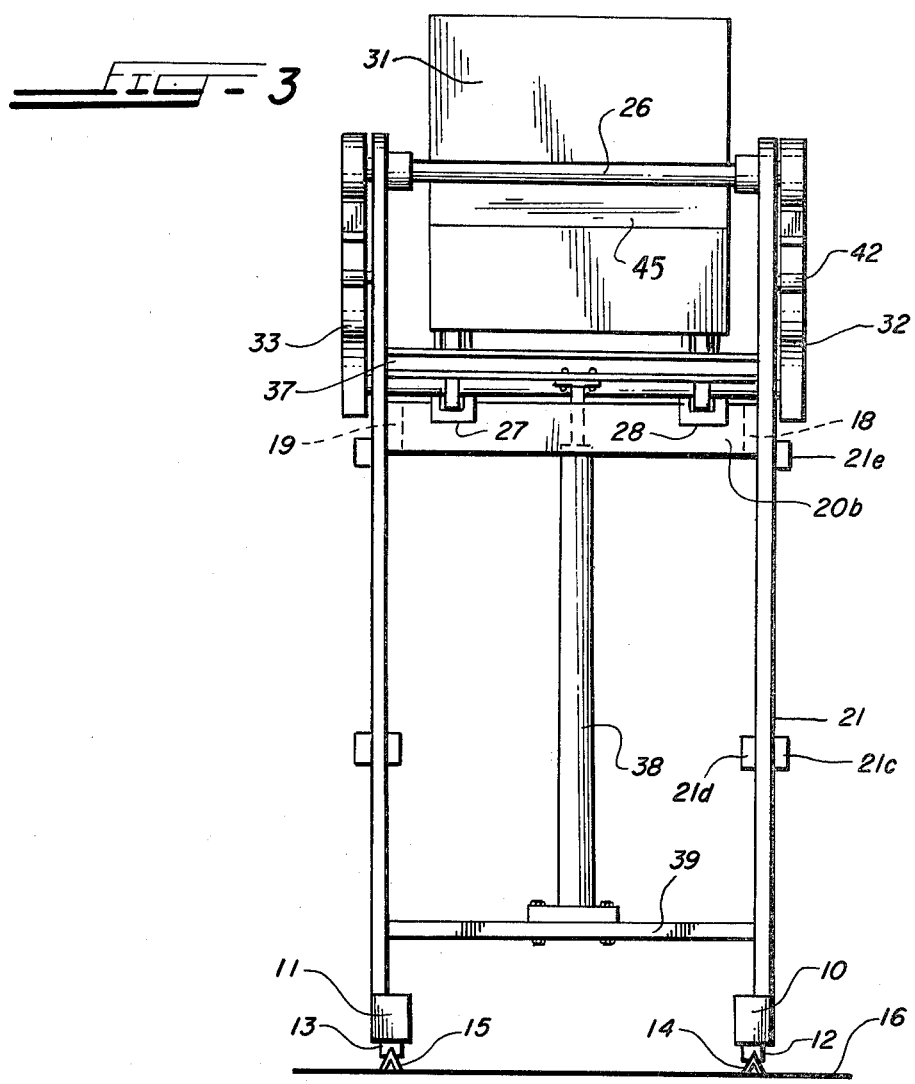
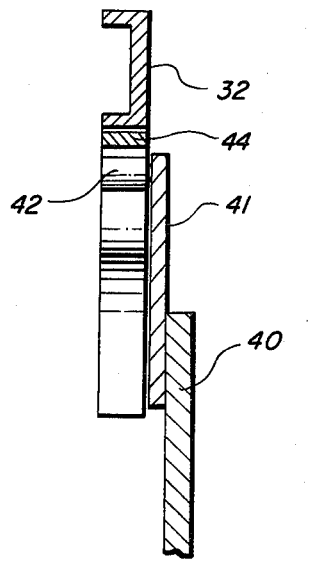
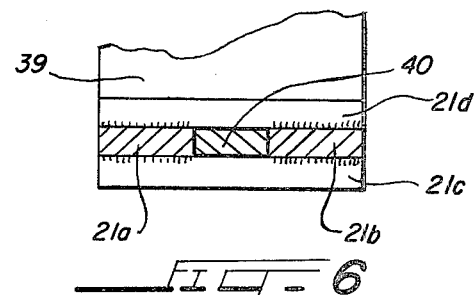
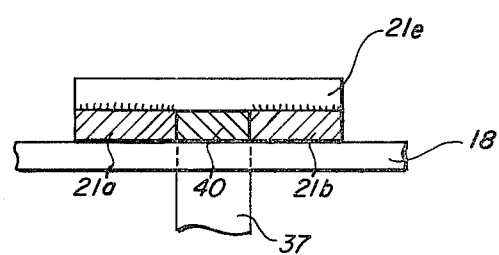

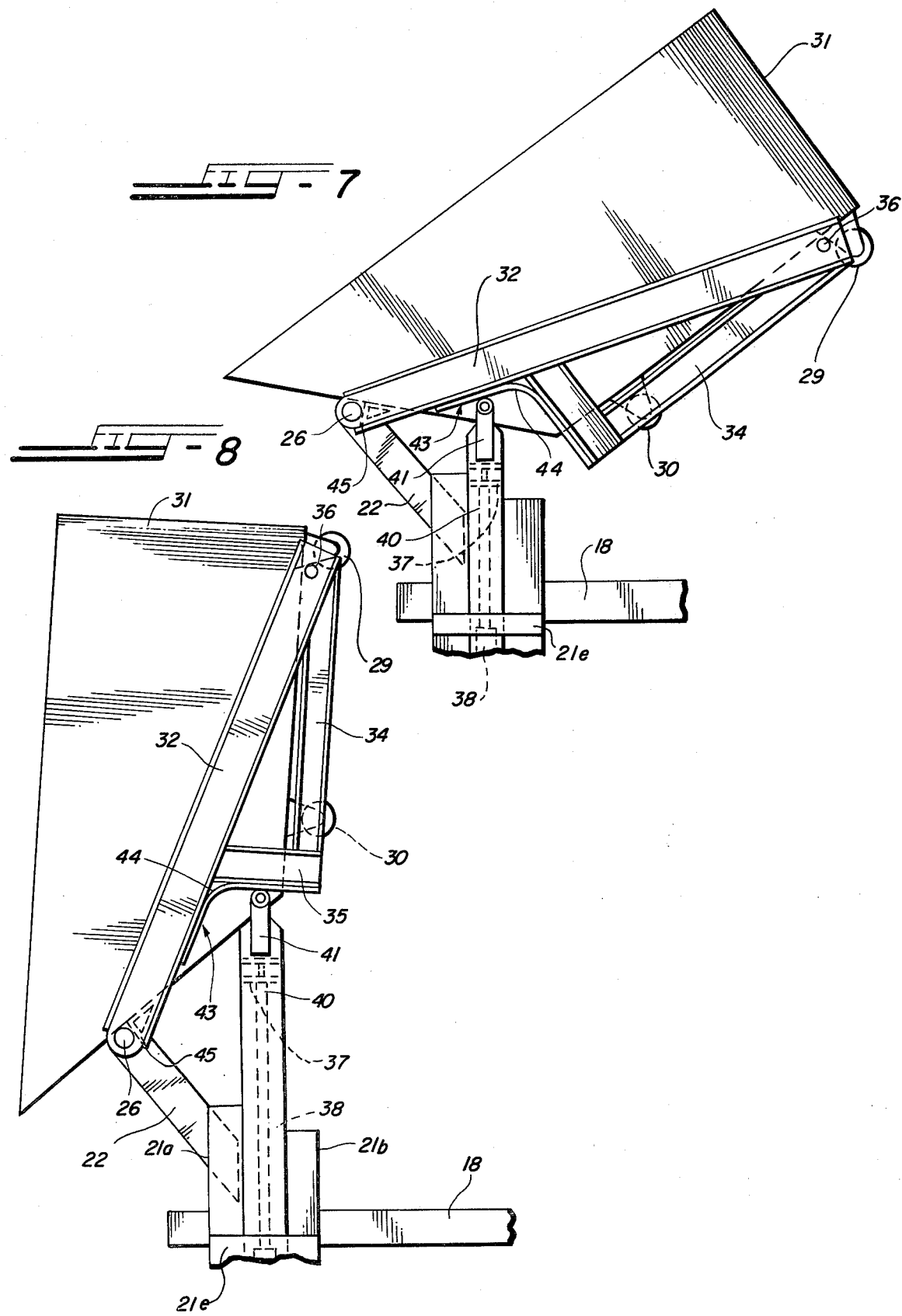

CONTAINER-DUMPING MACHINE

BACKGROUND OF THE INVENTION

Containers of bulk material are normally dumped mechanically wherever the weight of the loaded container exceeds that which can be handled easily by one man. The dump truck discharging its load of gravel is a familiar sight, and specialized machinery has been developed to empty an entire railroad car full of coal into a large hopper by gripping the car securely, and proceeding to rotate it about a horizontal axis parallel to the length of the car. These same principles are applicable through the full range of size of containers, except that it has been difficult to handle relatively small containers in this manner without producing a cost problem. Practically any factory has an endless number of applications involving bulk containers handling from a hundred to a thousand pounds of material, which is far in excess of that which can be handled properly by workmen without special equipment. The number of these applications, however, and the size of the loads involved, are such that the cost outlays for special-purpose dumping equipment of the type currently available are excessive. The present invention is directed primarily at mechanizing dumping operations of this type, where the containers involved are handled conveniently by a standard lift truck.

SUMMARY OF THE INVENTION

A base frame of the machine provides a solid fulcrum structure on which a receptacle can be supported in an attitude to receive and support an open-topped container in a generally horizontal position. A carriage is mounted for vertical movement along a guideway underneath the container receptacle, and has bearing elements adapted to engage the receptacle at a position laterally displaced from the pivot axis, so that vertical forces applied to the carriage will induce an up-and-over dumping action of the container supported by the receptacle. The surface of the receptacle engaged by the carriage has a cam configuration producing a fairly constant dumping moment as the carriage proceeds upwardly, and tends to minimize the lateral loading on the carriage guideway. The dumping action proceeds to a position approximately ninety degrees in angular displacement from the original position of the container, and is supported in this attitude by the engagement of an abutment on the container with structure fixed with respect to the frame, preferably the pivot shaft itself.

DESCRIPTION OF THE DRAWINGS

FIG. 3 is an elevation of the machine in the FIG. 1 position.

FIG. 4 is a section on the plane 4—4 of FIG. 1, on an enlarged scale.

FIG. 5 is a section on the plane 5—5 of FIG. 1, on an enlarged scale.

FIG. 6 is a section on the plane 6—6 of FIG. 1, on an enlarged scale.

FIG. 7 is a view of the machine illustrated in FIG. 1, in an intermediate position during the dumping movement.

FIG. 8 illustrates the position of the machine shown in FIG. 1, in the fully dumped position.

DESCRIPTION OF THE PREFERRED EMBODIMENT

Figure 1:
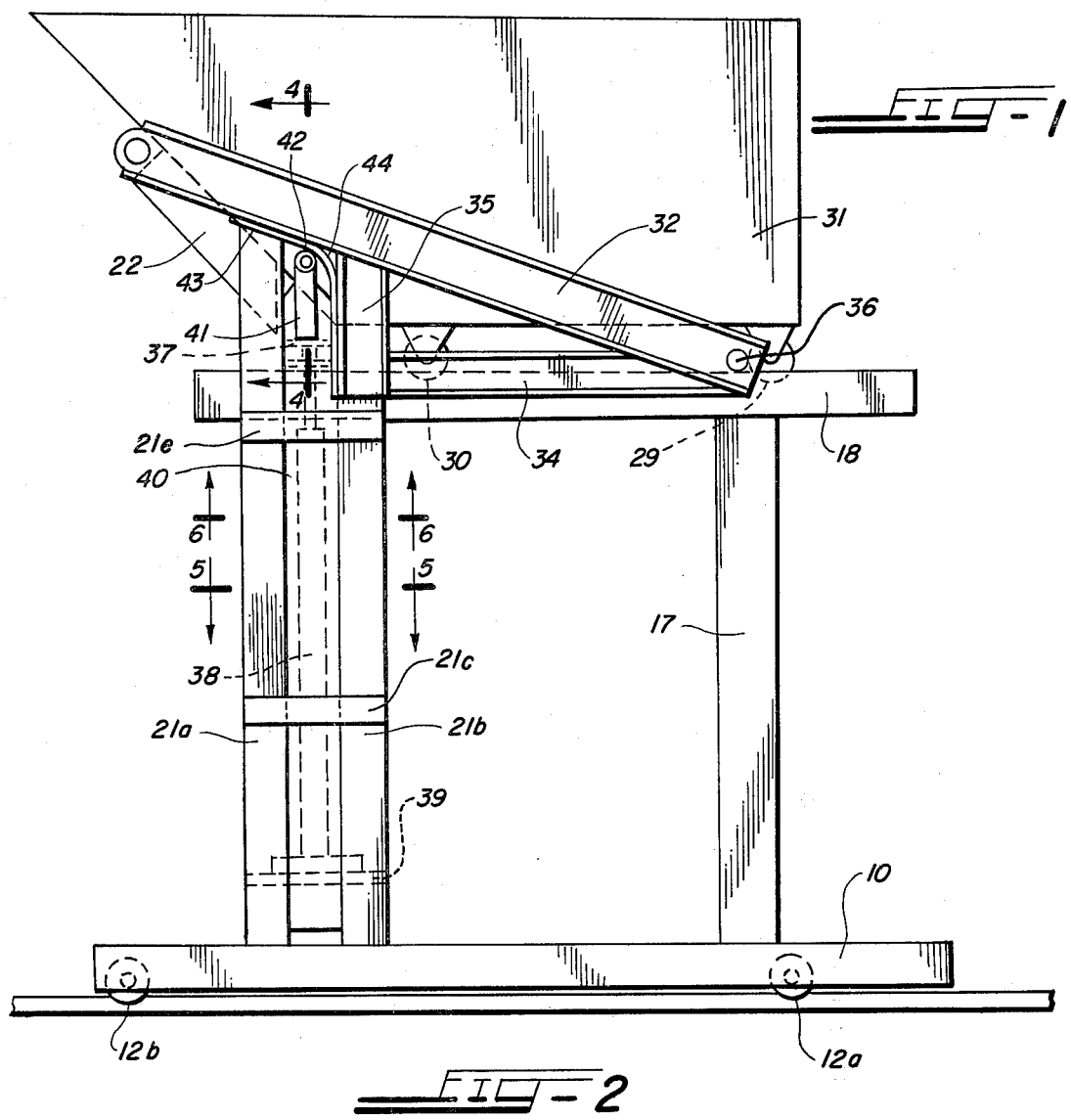
FIG. 1 is a side elevation of the dumping machine in the position corresponding to the initial placement of the container in the receptacle.
Figure 2:
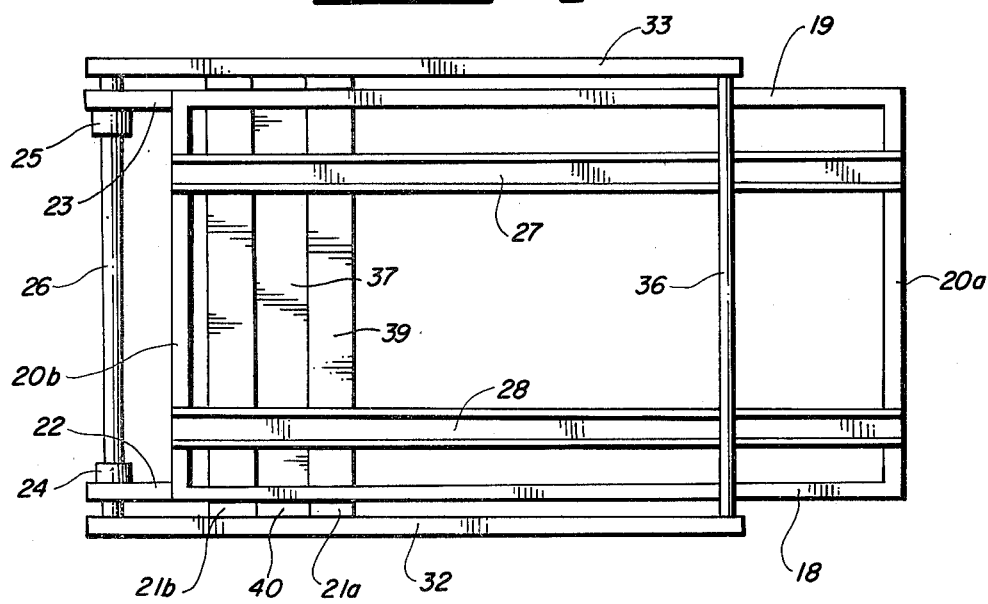
FIG. 2 is a top view of the machine, with respect to FIG. 1.

The base frame of the machine includes the lower horizontal beams 10 and 11, each of these being provided with rollers as shown at 12 and 13 in FIG. 3 engaging tracks 14 and 15, respectively, secured in any convenient manner to the floor 16. These tracks will usually establish a path to a particular position associated with a machine into which a container is to be dumped. At one end of the frame, vertical columns 17 on opposite sides of the machine support the upper horizontal beams 18 and 19 interconnected by the transverse beam 20a. At the opposite end of the machine, parallel vertical rails as shown at 21a–b in FIG. 1 provide guideways on the opposite sides of the machine. These rails are secured to the lower horizontal rails 10 and 11, and also to the upper horizontal rails 18 and 19. The fulcrum arms 22 and 23 are secured at the inside of the guideway rails 21, and are provided with bearings as shown at 24 and 25 receiving the pivot shaft 26. Channel rails 27 and 28 are positioned to receive rollers as shown at 29 and 30 in the opposite sides of the container 31. The opposite ends of these channel rails are secured to the transverse frame members 20a–b.

A container receptacle is formed by the spaced beams 32 and 33 that are inclined in the initial position of the machine shown in FIG. 1. A triangular configuration is formed on the opposite sides of the receptacle by the horizontal beams 34 and the short vertical beams 35. A rod 36 interconnects one end of this triangular configuration with the corresponding structure on the opposite side of the machine. The pivot shaft 26 is secured to the overhanging ends of the beams 32 and 33, which provides the pivotal support for the receptacle.

A carriage is formed by the transverse beam 37 (see FIG. 3) positioned by the hydraulic jack 38 resting on the cross beam 39 extending between the beams 21a–b on the opposite sides of the frame. The usual hydraulic lines and control devices associated with the hydraulic jack are not shown. The opposite ends of the beam 37 are provided with guideway followers as shown at 40 in FIGS. 5 and 6. These preferably extend over almost the full length of the guideways formed by the rails 21a–b to provide the maximum stability of alignment. The followers are in the form of beams sliding between the rails 21a–b, and confined laterally by the short horizontal bars 21c–e and the beams 18 and 19. At the upper extremities of the opposite guideway followers 40, brackets as shown at 41 support rollers as shown at 42 in FIG. 1 bearing on the underside of the receptacle. A heavy steel strap 43 has an angular configuration in side elevation, with one end being secured to the beam 32, and the opposite end to the short vertical member 35 of the receptacle. The arcuate central configuration 44 interconnects these two opposite end sections to form a cam surface fixed with respect to the receptacle, and on which the rollers 42 bear on the opposite sides of the machine. Vertical movement of the carriage thus induces the rotative dumping action illustrated in FIGS. 7 and 8. During this dumping movement, the container is lifted off the rails 27 and 28, and is supported by the combined effect of the rod 36 and the pivot shaft 26. As the dumping rotation proceeds through the FIG. 7 position to the position shown in FIG. 8, the tendency for the container to slip downwardly from these supports is prevented by the presence of the abutment rail 45 secured to the underside of the dumping end of the container 31. This rail engages the pivot shaft to maintain the elevated position of the container. The rod 36 also abuts the rear wheels and the associated brackets to stop the sliding tendency.

I claim:

1. In combination with a container, a container-dumping machine including a container receptacle, a frame, fulcrum means on said frame providing a pivotal support for said receptacle, and means for rotating said receptacle on said fulcrum means, wherein the improvement comprises:

means forming substantially vertical guideways on opposite sides of said frame, respectively; means forming a cam surface on said receptacle, a carriage mounted for movement along said guideways, said carriage having bearing means including a cam follower normally engaging said cam surface at a position displaced from the axis of said pivotal support; and drive means operative to induce movement of said carriage, and consequent rotation of said receptacle, said drive means, carriage, and guideways constituting said means for rotating said receptacle.

2. A machine as defined in claim 1, wherein said carriage is disposed below said receptacle, and said drive means induces an up-and-over rotation of said receptacle.

3. A machine as defined in claim 1, wherein said cam surface has angularly spaced sections interconnected by an arcuate section.

4. A machine as defined in claim 3, wherein said receptacle is supported by said frame in an initial position providing a substantially horizontal container position.

5. A machine as defined in claim 4, wherein one of said cam surface sections is substantially vertical, and on the opposite side of said follower means from said fulcrum means, with said receptacle in said initial position, said arcuate section continuing over said follower means.

6. A machine as defined in claim 4, wherein said follower means is below the level of said pivot support, with said receptacle in said initial position.

7. A machine as defined in claim 2, wherein said drive means is a hydraulic jack mounted on said frame between opposite sections of said guideway means.

8. A machine as defined in claim 1, wherein said fulcrum means includes a shaft, and said container has a supporting abutment engageable with said shaft on elevation of said container toward a rotated vertical dumping position.

* * * * *